(12) United States Patent
Cheng

(10) Patent No.: US 8,660,496 B2
(45) Date of Patent: Feb. 25, 2014

(54) ARRANGEMENT AND TECHNIQUE FOR INTERFERENCE MITIGATION

(75) Inventor: Matthew Cheng, Newbury (GB)

(73) Assignee: Vodafone Group PLC, Newbury (GB)

(*) Notice: Subject to any disclaimer, the term of this patent is extended or adjusted under 35 U.S.C. 154(b) by 1077 days.

(21) Appl. No.: 12/529,389

(22) PCT Filed: Mar. 3, 2008

(86) PCT No.: PCT/EP2008/052581
§ 371 (c)(1),
(2), (4) Date: Dec. 1, 2009

(87) PCT Pub. No.: WO2008/107425
PCT Pub. Date: Sep. 12, 2008

(65) Prior Publication Data
US 2010/0075654 A1    Mar. 25, 2010

(30) Foreign Application Priority Data
Mar. 2, 2007 (GB) .................................. 0704099.1

(51) Int. Cl.
H04B 1/00 (2006.01)
H04B 15/00 (2006.01)
H04B 1/10 (2006.01)
H04B 7/00 (2006.01)

(52) U.S. Cl.
USPC .............................. 455/63.1; 455/65; 455/522

(58) Field of Classification Search
None
See application file for complete search history.

(56) References Cited

U.S. PATENT DOCUMENTS

| | | | |
|---|---|---|---|
| 6,952,589 B1 * | 10/2005 | Mantha | 455/501 |
| 7,031,742 B2 | 4/2006 | Chen et al. | |
| 7,542,722 B2 | 6/2009 | Carlsson | |
| 2003/0013475 A1 * | 1/2003 | Yoshimura | 455/522 |
| 2003/0036358 A1 * | 2/2003 | Pan | 455/63 |
| 2003/0108013 A1 * | 6/2003 | Hwang et al. | 370/335 |
| 2004/0203991 A1 * | 10/2004 | Chen et al. | 455/522 |
| 2005/0036441 A1 * | 2/2005 | Laroia et al. | 370/203 |
| 2005/0043062 A1 * | 2/2005 | Ahn et al. | 455/560 |
| 2006/0165032 A1 | 7/2006 | Hamalainen et al. | |
| 2007/0141995 A1 * | 6/2007 | Youn et al. | 455/69 |

FOREIGN PATENT DOCUMENTS

DE   199 41 846   11/2000

* cited by examiner

Primary Examiner — Yuwen Pan
Assistant Examiner — Ayodeji Ayotunde
(74) Attorney, Agent, or Firm — B. Aaron Schulman; Stites & Harbison PLLC

(57) ABSTRACT

In a telecommunications network, including a first cell with a first base station node having a first node controller component and a first radio network controller (RNC) component; a method of mitigating interference within the first cell including: the first base station node determining when the first cell is experiencing interference; and the first base station node determining which one or more adjacent cells is likely to be a source of the interference; and the first base station node initiating a command configured to effect a reduction in power used by the one or more adjacent cells. The determination of likely interference source may be by received total wideband power (RTWP) measurements or outer loop power control (OLPC) commands. Preferably the first base station node determines the likely source of interference via the user terminals within its cell which are currently in soft handover, in that the cell or cells that they are in soft handover with are likely to contain the source of the interference.

17 Claims, 2 Drawing Sheets

ARRANGEMENT AND TECHNIQUE FOR INTERFERENCE MITIGATION

The present invention relates to an arrangement and technique for interference mitigation in a telecommunications network utilising eHSPA technology. More particularly, the invention relates to a Universal Mobile Telecommunications System (UMTS) or a Long Term Evolution (LTE) network utilising evolved High-Speed Packet Access (eHSPA) technology.

Since its introduction, third-generation (3G) cellular technology has provided the ability to deliver a higher number of voice channels and higher data bandwidths to user equipment/terminals (UEs) such as mobile handsets than is possible using second generation (2G) technologies. In reality, however, while most 3G networks allowed for higher capacity voice services, the same may not always apply to shared voice and data 3G networks.

In this regard High-Speed Packet Access (HSPA) was developed. HSPA is a bearer technology that provides a transitional platform for UMTS-based 3G/W-CDMA networks to offer higher data transfer speeds, and so bridges the performance gap between 3G networks and fixed DSL or cable internet networks. HSPA is made up of High Speed Downlink Packet Access (HSDPA) and High Speed Uplink Packet Access (HSUPA).

HSDPA provides impressive enhancements over W-CDMA, including shorter connection and response times. More importantly, HSPA offers a many-fold (at least three-fold and typically five-fold or more) throughput increase over R99 bearer technologies, which translates into significantly more data users on a single frequency or carrier. The substantial increase in data rate and throughput is achieved by implementing a fast and complex channel control mechanism based upon short physical layer frames, Adaptive Modulation and Coding (AMC), fast Hybrid-ARQ (Automatic Repeat-reQuest) and fast scheduling. The exact implementation of HSDPA is known, and so will not be described further here.

HSDPA has been included in the release 5 of 3GPP standards and is currently being deployed in 3G networks worldwide. HSUPA is the next evolution step for UMTS networks. HSUPA is also known as FDD Evolved Uplink (EUL) and has been introduced in the release 6 of 3GPP standards. Evolved HSPA is introduced in release 7 of 3GPP standards which contains several technologies of higher data rates and capacity as well as architectural changes known as eHSPA architecture.

HSUPA technology enables uplink packet data transmission by achieving data rates of up to 5.76 Mbps. Furthermore, HSUPA will increase uplink capacity and reduce latency. A combination of HSDPA and HSUPA is especially beneficial, since it will allow optimized packet data transfer in downlink and uplink. Services that benefit from HSUPA are multimedia applications requiring excellent uplink performance, such as voice over IP (VoIP), gaming, video streaming and file upload.

Since the introduction of HSPA, improvements have also been made to the network architecture. In this regard, an evolved HSPA (eHSPA) Node B has been proposed, which, in addition to its Node B functionally, includes RNC functionality: for this reason, the resulting architecture is commonly referred to as a "collapsed architecture". This eHSPA Node or eHSPA architecture enables user terminals to connect to a network whose architecture supports a direct GTP tunnel to the packet gateway (GGSN) bypassing legacy network elements (RNC and SGSN).

The RNC functionality is provided alongside the standard Node B functionality within the base station/Node B: the functionality including drift RNC (DRNC), serving RNC (SRNC) and controlling RNC (CRNC) functionality. With this architecture the call set up delay can be reduced, as there is minimal latency associated with the communications between the RNC functionality and the Node B functionality, since they are physically in close association. As will be appreciated by the reader, each of the functionalities may be implemented in software, firmware and/or hardware.

It is to be appreciated that the eHSPA Node B architecture has been designed so as to handle packet switched (PS) data communications more efficiently, as the RNC within the eHSPA Node B is able to communicate directly with the packet switched component gateway of the core network. Collapsing the architecture of an RNC into a Node B creates a problem in providing existing inter-Node B functionality realised across a SRNC.

One problem that has been encountered in relation to the use of the eHSPA architecture is that since there is potentially blocked, limited, or restricted coordination of soft handover between the serving (SRNC) and drift (DRNC) between the eHSPA Node Bs, the eHSPA Node Bs are more vulnerable to interference.

This problem will be particularly acute once HSUPA is implemented, as a single terminal will then be capable of unduly interfering with other terminal's ability to access the network, in view of the high data rates HSUPA makes possible.

In this regard, interference mitigation control is an important function that needs to be maintained so that adjacent uplink cell interference can be reduced, which will improve overall coverage and capacity of W-CDMA.

Therefore while the collapsed architecture of eHSPA Node Bs provides many advantages, such as minimising system complexity and transport overheads, there is also a need to ensure that there is no impact from interference on real-time services like voice and video telephony.

According to one aspect of the present invention there is provided, in a telecommunications network including a first cell with a first base station node having a first node controller component and a first radio network controller (RNC) component, a method of mitigating interference within the first cell including: the first base station node determining when the first cell is experiencing interference; and the first base station node determining which one or more adjacent cells is likely to be a source of the interference; and the first base station node initiating a command configured to effect a reduction in power used by the one or more adjacent cells.

According to a further aspect of the present invention there is provided a telecommunications network apparatus for mitigating interference within cells of a telecommunications network, the network including a plurality of base station nodes each having a corresponding cell, a first of said base station nodes having a corresponding first cell and including a first node controller component and a first radio network controller (RNC) component; wherein the first base station node further includes means to determine when the first cell is experiencing interference; means for inferring which of one or more adjacent cells is likely to be a source of the interference; and means for initiating a command configured to effect a reduction in power used by the one or more adjacent cells.

For a better understanding of the present invention, reference will now be made, by way of example only, to the accompanying drawing in which:

FIG. 1 illustrates a network configuration with three eHSPA Node Bs 11, 12, 13 each in communication with the core network via a Gateway GPRS Support Node (GGSN) 14. It is to be appreciated that the number of eHSPA Node Bs under the control of each GGSN can vary as required, and the number in FIG. 1 is purely an example configuration.

Figure 2:
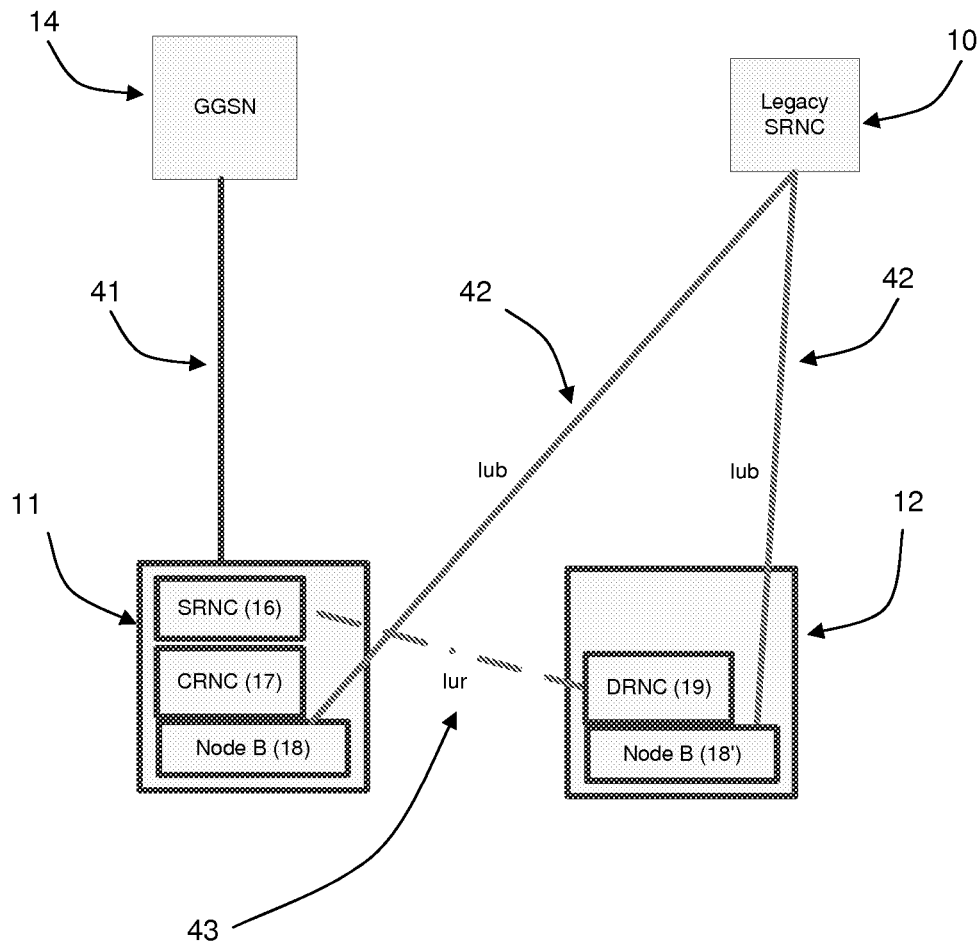
FIG. 2 illustrates the relationship between two eNode Bs in the architecture of FIG. 1.

FIG. 2 shows some of the functionalities in each eNode B. The network configuration illustrates how an eHSPA Node B can act as a controlling or serving RNC (CRNC 17 or SRNC 16), and with a soft handover radio link acting as a drift RNC (DRNC 19). A legacy controlling RNC 10 can also be configured to be connected to a plurality of cells 21, 22, 23 corresponding to eHSPA Node Bs 11, 12, 13 respectively.

One embodiment of the invention seeks to avoid, or at least suppress or mitigate, uplink or downlink interference from an adjacent cell, particularly where HSUPA and/or HSDPA are supported. Specifically, this embodiment provides soft handover interference mitigation across collapsed nodes (SRNC/Node-B to DRNC/Node-B) by acting on power control commands when a SRNC is collapsed into a Node B, as is described hereafter in relation to the FIG. 1 architecture.

Each eHSPA Node B cell 21, 22, 23 is allocated a Received Total Wideband Power (RTWP) threshold that it is not allowed to exceed. RTWP is a key measurement which is used for admission and congestion CRNC functionality. This threshold may be different for each cell, or there may be a default RTWP threshold for each cell. The threshold for each cell, however, is able to control user's power, such as in response to a received outer loop power control (OLPC) down command. An example of a preferred threshold value is 8 dB. RTWP reflects the total noise level within the UMTS frequency band of one single cell.

Therefore, in operation, each eHSPA Node B will be aware of its number of active users, and will monitor the level of its RTWP. In this regard, based upon its number of active users, each eHSPA Node B will be able to determine the expected level of RTWP. For instance, five UEs in a cell with Circuit Switched (CS) (i.e. voice) connections may typically require 4 dB of RTWP. If the expected level then approximates the actual measured level of its RTWP, the eHSPA Node B will know that the users in the cell are not experiencing any undue interference in their communications.

If however, the estimated cell level RTWP is 4 dB, but the actual measured level of RTWP is 6 dB, then the eHSPA Node B's cell may have one or more external interference sources which are causing the UEs within its cell to rely on outer loop control to increase SIR target to power up in order to overcome the effects of the interference source. This "powering up" of UEs is undesirable, as it causes the terminals to use more power than usual to maintain the communication, and also has an overall exponential effect on power usage, as more and more UEs get drawn into the need to "power up" to maintain their communications. The eHSPA Node B will tolerate the interference being experienced until its own RTWP reaches its designated RTWP threshold. The standard RTWP threshold for each cell is preferably initially set at a level where the inter-cell interference will be mitigated before any cell users are unduly affected.

Once an eHSPA Node B notes that its RTWP threshold has been reached, despite its expected RTWP level being less than the threshold, the eHSPA Node B is configured to deduce the source or sources of the problem indirectly and to mitigate the interference.

In the invention, each eHSPA Node B 11 selectively identifies neighbouring cells 22, 23 most likely to be the interference source, in order to minimise the complexity of the signalling needed in order to mitigate the interference. In particular, the eHSPA Node B seeks to identify and target which adjacent cells are likely to have high interference radio links, such as HSUPA/EUL or 384 kbps Direct Channel (DCH) users.

Neighbouring cells 22, 23 that are most likely to affect user equipment (UE) in cell A 21 can be identified by determining which UEs are in soft handover. In this regard, it is to be appreciated that soft handover is a form of handover where the mobile augments its pseudonoise (PN) spreading or scrambling code when handing over from one base station (Node B) to the next while the frequency channel remains the same. High interference radio links in a cell force UEs camped on that cell to power up to maintain their connections to the cell's eNode B: this also affects UEs in the cell which are in soft handover to neighbouring cells.

Figure 1:
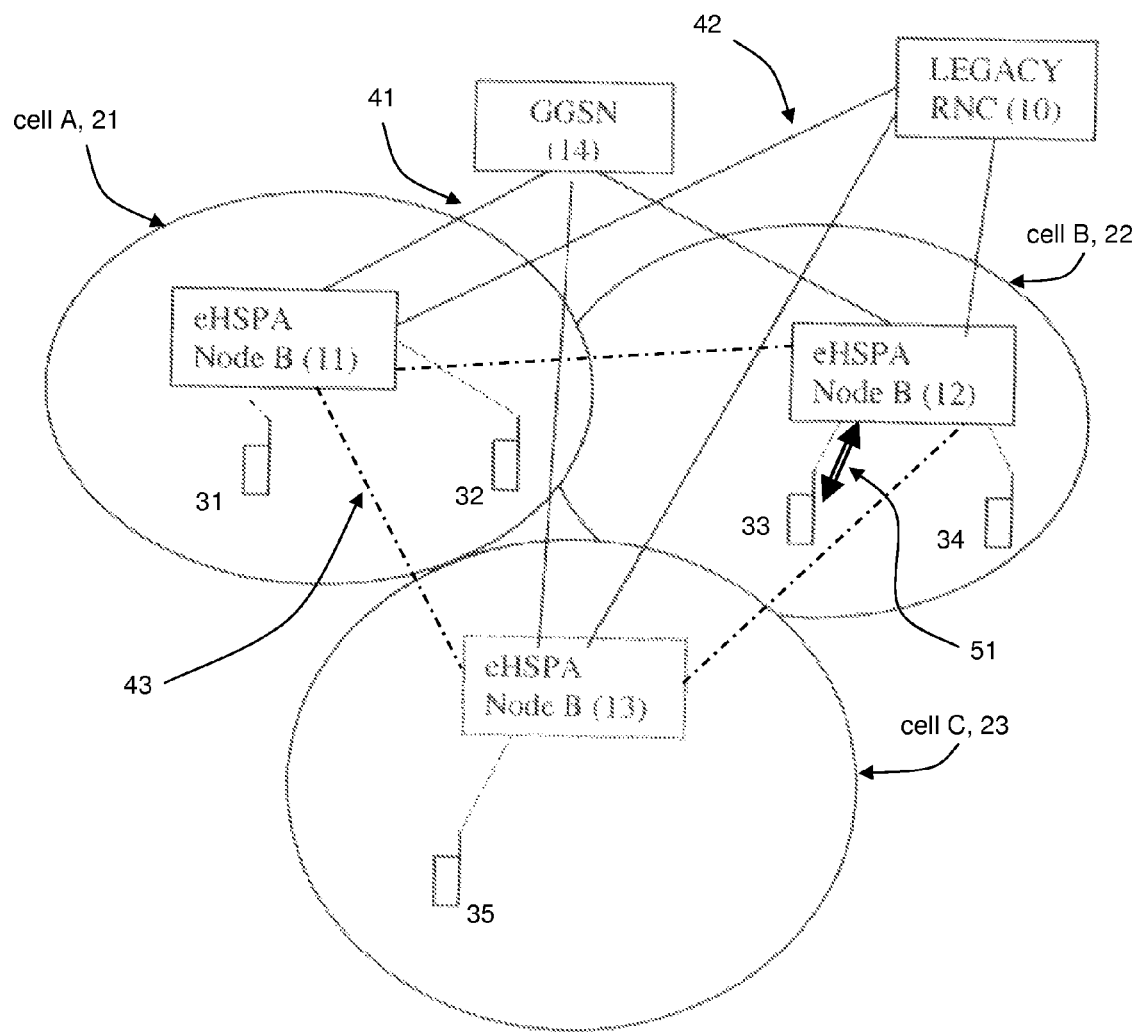
FIG. 1 illustrates network architecture useful in explaining the embodiments of the invention.

In other words, referring to FIG. 1, consider the situation of the UEs 31, 32 in the cell 21 of evolved Node 11, with one UE 31 being in soft handover with the cell 22 of evolved Node 12.

Evolved Node B 11 has noted that its expected RTWP is much lower than its actual RTWP, and its RTWP threshold has been exceeded. Evolved Node B 11 infers that one or more of its UEs are therefore powering up in order to overcome interference being received from one or more adjacent cells. Evolved Node B 11 then determines which of its UEs are in soft handover. In the illustrated situation, one UE 32 is immediately adjacent to cell B 22, such that it is in soft handover with evolved Node B 12.

The Evolved Node B 11 then issues a request to trigger the powering down of the cell 22 of evolved Node B 12.

This request may be sent directly to the DRNC component of evolved Node B 12. Alternatively, the RNC component of evolved Node B 11 will issue a request to the controlling (legacy) RNC 10 to reduce the threshold of the cell of evolved Node B 12. In this regard, the evolved Node B 12 would notify the controlling (legacy) RNC 10 or CRNC 17 of eNode B 11, acting as a general controller of this arm of the network, of the cells it considers to be causing the interference, which in this instance is the cell of evolved Node B 12. The controlling RNC 10, 17 would then issue a command for the evolved Node B 12 to reduce its RTWP threshold.

In this way, it becomes possible to target cells that are sources of interference from offending users in adjacent cells that are normally outside the direct control of the CRNC.

According to a first embodiment of the invention, the evolved Node B 12 determines that its cell is causing interference. For instance, this may occur if the EUL packet traffic load on the SRNC of evolved Node B 12 reaches above an uplink interference threshold (for example 6 dB noise rise) for a defined window of time (e.g. 5 seconds). This interference situation may cause high interference on independent radio link(s) in an adjacent cell. The evolved Node B 12 therefore determines which of its neighbouring nodes have at least one active voice radio link (i.e. are in soft handover with cell B 22).

The evolved Node B 12 can then send a measurement report to its connected RNCs in adjacent cells (in the illustrated instance, the CRNC 16 of evolved Node B 11) once its specific RTWP threshold is triggered.

Once the CRNC 16 of evolved Node B 11 has determined that evolved Node B 12 has active voice radio links 51, evolved Node B 11 would then react and request to trigger the powering down of cell B 22 via signalling (Iub/Iur interface 42), to reduce power to a specific target relative RTWP value for connected EUL or PS DCH radio links.

The Evolved Node B 11 therefore infers that the source of the interference is the cell 22 of evolved Node B 12 based on its records of connected UEs in soft handover and the reports from the eNode Bs of neighbouring cells.

In a second embodiment of the invention, measured cell RTWP coming from one or more active users in soft handover to an adjacent cell are supplemented by the detection of excessive outer loop power control (OLPC) commands between individual UEs and the eNode B 12.

In a third embodiment of the invention, the report from the eNode B 12 includes reports of UEs in soft handover with cells other than that of eNode B 11 which may nevertheless be sources of interference for eNode B 11.

The embodiments just described can be used separately or in conjunction with one another.

These embodiments of the invention have been described in relation to a UMTS network incorporating eHSPA Node Bs. However, the embodiments may readily be applied to any network incorporating eHSPA Node Bs or the like, such as the proposed LTE network.

One outcome of the implementation of the invention is that high interference radio links (EUL or 384/DCH users) in an adjacent cell are targeted by adapting methods which consider traffic loads of serving and adjacent cells when a SRNC manages resources for active voice or real-time connections which are in soft handover.

For example, when uplink interference in a cell becomes high, the SRNC reacts and issues a request to a specific DRNC 19/Node-B cell. When uplink interference in an adjacent cell becomes high, the Node B for that adjacent cell sends a measurement report to its connected RNCs 10, 17 once specific thresholds are triggered which consider:

Method 1: Node B Scheduler control based on real time service load.

An example is if voice traffic load on a SRNC 16 reaches above an uplink interference RTWP threshold (for example 6 dB noise rise) for a defined window of time (e.g. 5 seconds) where a single adjacent radio link would affect CS services. In this case SRNC 16 would react and inform DRNC 19/Node-B cells via signalling (Iub/Iur interface) which have active voice radio links only, to reduce power to a specific target relative RTWP value (received total wideband power) for connected EUL or PS DCH radio links.

Method 2: Node-B to CRNC reporting based on PS load.

An example is if R99 or EUL PS traffic load on a cell reaches above a threshold (for example 6 dB noise rise). The serving Node-B informs SRNC/adjacent Node-B via signalling (Iub/Iur interface) after a defined window of time (e.g. 5 seconds) via signalling to 'report' RTWP if OLPC up-power commands are detected for voice radio links on the same serving cell. Note the reporting should only apply to DRNC/Node-B cells if soft handover links exist. On reception of a reported RTWP to a SRNC, it should react and issue a new target relative RTWP value as in Method 1.

In the absence of OLPC up-power commands, there may yet be an independent high interference radio link. For example there may be an EUL packet radio link with eNode B 12 of which eNode B 11 would otherwise be unaware. The eNode B 12 could report on this radio link if the RTWP threshold was exceeded as a result of such a radio link.

This invention can provide improved coverage and capacity in the uplink for real time services, like circuit switched voice and video telephony services.

The invention claimed is:

1. A method of mitigating interference in a telecommunications network that includes a first cell with a first base station node having a first node controller component and a first radio network controller (RNC) component, the method comprising:
   the first base station node determining when the first cell is experiencing interference;
   the first base station node determining each adjacent cell that is likely to be a source of the interference; and
   the first base station node initiating a command configured to effect, for each adjacent cell determined likely to be a source of the interference experienced by the first cell, a reduction in a corresponding threshold power use level for the adjacent cell that a base station node of the adjacent cell is not permitted to exceed.

2. The method of claim 1, wherein the first base station node determines each adjacent cell that is likely to be the source of the interference by determining:
   at least one user terminal within the first cell which is in soft handover and a neighboring cell with which each of the at least one user terminal is in handover; and
   determining each determined neighboring cell as a possible source of the interference.

3. The method of claim 1, wherein the first base station node determines each adjacent cell that is likely to be the source of the interference by:
   identifying at least one neighboring cell which has active real time service radio links.

4. The method of claim 1, wherein the telecommunications network further includes a second cell with a second base station node having a second node controller component and a second radio network controller (RNC) component;
   the second base station node measuring a performance parameter of the second cell;
   the second base station node measuring an expected performance parameter value of the second cell;
   the second base station node comparing the measured performance parameter value of the second cell with a predetermined performance parameter threshold;
   the second base station node determining that the first cell is experiencing interference as a result when the measured performance parameter value exceeds the expected performance parameter value and the performance parameter threshold; and
   the second base station node reporting this determination to the first base station node; and
   wherein the first base station node determines the first cell to be experiencing interference upon receiving said report.

5. The method of claim 4, wherein the performance parameter value is a Received Total Wideband Power (RTWP).

6. The method of claim 4, wherein the step of determining each adjacent cell that is likely to be the source of the interference further includes:
   identifying at least one neighboring cell based on excessive outer loop power control (OLPC) commands coming from one or more active users in soft handover to an adjacent cell.

7. The method of claim 4, wherein the step of determining each adjacent cell that is likely to be the source of the interference further includes:
   reciprocally reporting excessive interference by an adjacent cell to a target or source cell caused by independent EUL packet radio links.

8. The method of claim 1, wherein the command configured to effect a reduction in the corresponding threshold power use level for each adjacent cell determined likely to be a source of the interference is a message identifying one or more cells containing a possible source of interference, and wherein the message is transmitted to a serving RNC, which in turn transmits a message to each of the one or more identified cells instructing the identified cell to reduce an RTWP threshold of the identified cell.

9. A system for mitigating interference within cells of a telecommunications network, the system comprising:
- a plurality of base station nodes each having a corresponding cell, a first of said base station nodes having a corresponding first cell and including a first node controller component and a first radio network controller (RNC) component; and
- wherein the first base station node is configured to:
- determine when the first cell is experiencing interference;
- determine each adjacent cell that is likely to be a source of the interference; and
- initiate a command configured to effect, for each adjacent cell determined likely to be a source of the interference experienced by the first cell, a reduction in a corresponding threshold power use level for the adjacent cell that a base station node of the adjacent cell is not permitted to exceed.

10. The system of claim 9, wherein the first base station node determines each adjacent cell that is likely to be the source of the interference by determining:
- at least one user terminal within the first cell which is in soft handover and a neighboring cell with which each of the at least one user terminal is in handover; and
- determining each determined neighboring cell as a possible source of the interference.

11. The system of claim 9, wherein the first base station node determines each adjacent cells that is likely to be the source of the interference by:
- identifying at least one neighboring cell which has active real time service radio links.

12. The system of claim 9, wherein the telecommunications network further includes a second cell with a second base station node having a second node controller component and a second radio network controller (RNC) component;
- the second base station node measuring a performance parameter of the second cell;
- the second base station node measuring an expected performance parameter value of the second cell;
- the second base station node comparing the measured performance parameter value of the second cell with a predetermined performance parameter threshold;
- the second base station node determining that the first cell is experiencing interference as a result when the measured performance parameter value exceeds the expected performance parameter value and the performance parameter threshold; and
- the second base station node reporting this determination to the first base station node; and
- wherein the first base station node determines the first cell to be experiencing interference upon receiving said report.

13. The system of claim 12, wherein the performance parameter value is a Received Total Wideband Power (RTWP).

14. The system of claim 12, wherein the step of determining each adjacent cell that is likely to be the source of the interference further includes:
- identifying at least one neighboring cell based on excessive outer loop power control (OLPC) commands coming from one or more active users in soft handover to an adjacent cell.

15. The system of claim 12, wherein the step of determining each adjacent cell that is likely to be the source of the interference further includes:
- reciprocally reporting excessive interference by an adjacent cell to a target or source cell caused by independent EUL packet radio links.

16. The system of claim 9, wherein the command configured to effect a reduction in the corresponding threshold power use level for each adjacent cell determined likely to be a source of the interference is a message identifying one or more cells containing a possible source of interference, and wherein the message is transmitted to a serving RNC, which in turn transmits a message to each of the one or more identified cells instructing the identified cell to reduce an RTWP threshold of the identified cell.

17. A method of mitigating interference in a telecommunications network that includes a first cell with a first base station node having a first node controller component and a first radio network controller (RNC) component, the method comprising:
- the first base station node determining that the first cell is experiencing interference upon a determination that a corresponding power use threshold for the first base station node is exceeded; and
- upon determining that the first cell is experiencing interference, the first base station node:
  - determining each adjacent cell that is a likely source of the interference for the first cell;
  - generating, for each adjacent cell determined to be a likely source of the interference experienced by the first cell, a request for a base station node of the adjacent cell to reduce a corresponding power use limit value for the adjacent cell that the base station node is not permitted to exceed; and
  - issuing the request for each adjacent cell determined to be a likely source of the interference to trigger a reduction in the corresponding power use limit value for the adjacent cell that the base station node of the adjacent cell is not permitted to exceed.

* * * * *